United States Patent Office 3,579,523
Patented May 18, 1971

3,579,523
ANILIDES OF QUINUCLIDINE-2- AND QUINUCLIDINE-3-CARBOXYLIC ACID
Rune Verner Sandberg, Jarna, and Berndt Olof Harald Sjoberg, Sodertalje, Sweden, and Claes Philip Tegner, deceased, late of Sodertalje, Sweden, by Gunnel Margareta Tegner, executrix, Sodertalje, Sweden, assignors to Aktiebolaget Astra, Sodertalje, Sweden
No Drawing. Filed May 17, 1968, Ser. No. 729,947
Claims priority, application Sweden, May 23, 1967, 7,251
Int. Cl. C07d 36/09
U.S. Cl. 260—293.4                     7 Claims

ABSTRACT OF THE DISCLOSURE

A process for preparing anilides of quinuclidine-2- and quinuclidine-3-carboxylic acid, their therapeutically acceptable salts, and pharmaceutical preparations is disclosed, as well as anilide compounds of the formula:

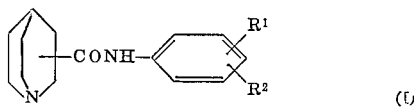
(I)

wherein $R_1$ and $R_2$ may be the same or different and represent hydrogen, halogen, or alkyl having at most three carbon atoms. Antiarrhythmic and local anesthetic effects of the disclosed compounds are shown.

---

The present invention relates to anilides of quinuclidine-2- and quinuclidine-3-carboxylic acid, their salts, and pharmaceutical preparations thereof, and also to a process for their preparation.

More particularly the present invention relates to new compounds of the formula

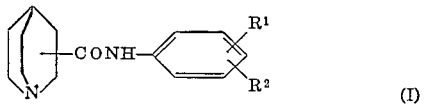
(I)

which are amides derived from quinuclidine-2- or quinuclidine-3-carboxylic acid, and wherein $R^1$ and $R^2$ may be the same or different and each represents a hydrogen or halogen atom or an alkyl group of at most 3 carbon atoms, and therapeutically acceptable salts thereof, and also a process for their preparation, as well as pharmaceutical preparations thereof.

An object of the present invention is to provide anilides of quinuclidine-2- and quinuclidine-3-carboxylic acid and salts thereof.

Another object of the present invention relates to the preparation of pharmaceutical compositions suitable for manufacturing and which can be administered to animals including man.

According to the present invention the compounds of the Formula I are prepared by reacting a compound of the formula

(II)

or a salt thereof with a compound of the formula

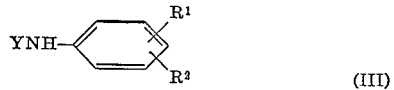
(III)

wherein $R^1$ and $R^2$ have the meaning given above, —COX is a carboxyl group or a reactive group derived therefrom bound in 2- or 3-position of the quinuclidine group and Y is hydrogen or an activating group such as Na,

or

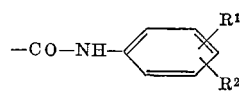

The compound of the Formula II is a carboxylic acid, an acid chloride or its functional equivalent such as an acid bromide, an ester, the anhydride, a mixed anhydride, especially one formed with an alkoxy formid acid, or a derivative obtained by reaction between a carboxylic acid and a carbodiimide or other compounds functioning in the same way, such as N,N¹-carbonyl diimidazole or N-ethyl-5-phenyl isoxazolium-3′-sulphonate.

Where the anilide is required in the form of a therapeutically acceptable salt the process may include the step of converting the base of the Formula I into the desired salt by reacting with the appropriate acid.

The expression "therapeutically acceptable salt" is recognized in the art to designate an acid addition salt, which is physiologically innocuous when administered in a dosage and at an interval (e.g. frequency of administration) that is effective for the indicated therapeutic use of the parent compound. Typical therapeutically acceptable acid addition salts of the compounds of Formula I include, but are not limited to, the salts of mineral acids such as hydrochloric, hydrobromic, phosphoric or sulphuric acid, and of organic acids such as lactic, levulinic, citric, fumaric, maleic, succinic, tartaric, benzoic acid, and sulphonic acids such as methane sulphonic acid and sulphamic acid.

Starting material of the Formula II may be prepared in the following ways: Quinuclidine-2-carboxylic acid is prepared according to E. Renk et al. (Helv. Chim. Acta 37 (1954), 2119), and quinuclidine-3-carboxylic acid according to C. A. Grob and E. Renk (Helv. Chim. Acta 37 (1954), 1689), and the reactive derivatives of the above acids are prepared therefrom by methods known in the art.

According to a preferred embodiment of the invention, a lower alkyl ester of a quinuclidine carboxylic acid is reacted with the Grignard reagent of the aniline compound.

According to another preferred embodiment of the invention, the anhydride of a quinuclidine carboxylic acid is reacted with the aniline compound.

On clinical practice the derivatives of the invention will normally be administered orally or by injection in the form of pharmaceutical preparations comprising the active ingredient in the form of the free base or one of the common therapeutically acceptable salts, e.g. the hydrochloride, in association with a pharmaceutically acceptable carrier which may be a solid, semi-solid or liquid diluent or an ingestible capsule. Usually the active substance will comprise between 0.1% and 85% by weight of the preparation, for example, between 0.5% and 5% for preparations intended for injection and between 2% and 50% for preparations intended for oral administration.

To produce pharmaceutical preparations in the form of dosage units for oral application containing a compound of the invention in the form of the free base or a pharmaceutically acceptable acid addition salt, such a compound may be mixed with a solid, pulverulent carrier, for example lactose, saccharose, sorbitol, mannitol, startches such as potato starch, corn starch, or amylopectin, cellulose derivatives, gelatin. The carrier may also be lubricants such as magnesium or calcium stearate, a Carbowax or other polyethylene glycol wax compressed to form tablets or, preferably, cores which are then coated with a concentrated sugar solution which may contain, e.g., gum arabic, gelatin, talcum and/or titanium dioxide, or alternatively with a lacquer dissolved in a readily violatile organic solvent or mixture of organic solvents. Dyestuffs can be added to these coatings. By using several layers of the active drug, separated by slowly dissolving coatings, sustained release tablets are obtained. Another way of preparing sustained release tablets is to divide the dose of the active drug into granules with coatings of different thickness, and compress the granules into tablets together with the carrier substance. The active substance can also be incorporated in slowly-dissolving tablets made, for example, of fat and wax substances, or evenly distributed in a tablet of an insoluble substance such as a physiologically inert plastic substance.

Soft gelatin capsules (pearl-shaped closed capsules) and other closed capsules consist, for example, of a mixture of gelatin and glycerol, and contain, e.g., mixtures of the active substance with a vegetable oil, and hard gelatin capsules contain, for example, granulates of the active substance with solid, pulverulent carriers such as lactose, saccharose, sorbitol, mannitol; starches such as potato starch, corn starch or amylopectin; cellulose derivatives or gelatin, as well as magnesium stearate or stearic acid.

For parenteral application by injection the preparations of the invention advantageously comprise an aqueous solution of a water soluble, pharmaceutically acceptable salt of the active substance and optionally also a stabilizing and/or a buffer substance. Solutions intended for use in local anaesthesia may be made isotonic by the addition of sodium chloride for example. As is known in the art of local anaesthesia, the effectiveness of the anaesthesia may be improved by addition of a vasoconstrictor such as adrenaline, noradrenaline or octapressin.

The compounds of the present invention are potential antiarrhythmic agents since they decrease excitability and prolong the refractory period and the conduction time in the atria of guinea pig heart (Table 2). Most of the compounds of the invention also show strong local anaesthetic effects as is illustrated for some of them in Table 1 below.

TABLE 1.—LOCAL ANAESTHETIC ACTIVITY

| Compound of Formula I | | Positional isomer | Isolated frog sciatic nerve block (lidocaine=1) | Rabbit cornea (lidocaine=1) |
| --- | --- | --- | --- | --- |
| $R^1$ | $R^2$ | | | |
| 2-$CH_3$ | H | 2 | 0.3 | 0.2 |
| 2-$CH_3$ | 6-$CH_3$ | 2 | 1 | 0.9 |
| 2-$CH_3$ | 6-$C_2H_5$ | 2 | 0.8 | |
| 2-$C_2H_5$ | 6-$C_2H_5$ | 2 | 1.1 | 1.5 |
| 2-Cl | H | 2 | 0.2 | 0.3 |
| 2-Cl | H | 3 | 0.2 | 0.6 |

TABLE 2.—RELATIVE CONCENTRATIONS PRODUCING 50% INCREASE IN REFRACTORY PERIOD AND CONDUCTION TIME

| Compound (positional isomer: 2) | | Threshold | Refractory period | Conduction time |
| --- | --- | --- | --- | --- |
| $R^1$ | $R^2$ | | | |
| Lidocaine | | 1.00 | 1.00 | 1.00 |
| 2-$CH_3$ | 6-$CH_3$ | 0.50 | 0.50 | 0.50 |
| 2-$CH_3$ | 6-$C_2H_5$ | 0.50 | 0.15 | 0.25 |
| 2-$C_2H_5$ | 6-$C_2H_5$ | 0.25 | 0.25 | 0.15 |

The invention is further illustrated by the following examples.

EXAMPLE 1

Quinuclidine-2-carboxylic acid o-toluidide

A mixture of 4.5 g. of methyl quinuclidine-2-carboxylate, 2.9 g. of o-toluidine and 0.1 g. of sodium was heated at 140° C. for 5 hours. The reaction mixture was then treated with water and ether, the separated water layer extracted twice with ether and the combined ether solutions extracted with dilute hydrochloric acid. The acid extracts were made strongly alkaline and the precipitated crystalline base recrystallized from aqueous alcohol. Yield 2.1 g., M.P. 115.5–7° C.

Calcd. for $C_{15}H_{20}N_2O$ (percent): C, 73.77; H, 8.25; N, 11.47. Found (percent): C, 73.4; H, 8.21; N, 11.6.

EXAMPLE 2

Quinuclidine2-carboxylic acid o-chloroanilide

By the same method as described in Example 1 but replacing the o-toluidine with 3.5 g. of o-chloroaniline and heating for 15 hours quinuclidine-2-carboxylic acid o-chloroanilide was prepared. Yield 2.6 g., M.P. 117–9.5° C. (from 60% aqueous alcohol).

Calcd. for $C_{14}H_{17}N_2OCl$ (percent): C, 63.5; H, 6.47; N, 10.58; Cl, 13.39. Found (percent): C, 63.3; H, 6.55; N, 10.5; Cl, 13.4.

EXAMPLE 3

Quinuclidine-2-carboxylic acid 2,6-xylidide

A mixture 2.42 g. of 2,6 xylidine in 15 ml. of ether was added dropwise to a solution of methylmagnesiumiodide prepared from 0.49 g. of magnesium turnings and 2.84 g. of methyliodide in 20 ml. of ether. Thereupon 1.69 g. of methyl quinuclidine-2-carboxylate in 10 ml. of ether were added and the mixture refluxed for 3 hours. The reaction mixture was then treated with dilute hydrochloric acid, the aqueous phase separated and the pH adjusted to 5.7. After extraction with ether (the extract, containing unreacted xylidine, was discarded) the solution was made strongly alkaline and the precipitated base extracted with ether. After drying over potassium carbonate the base was converted to hydrochloride, which was recrystalized from ethanol-diisopropylether. Yield 0.85 g., M.P. 223–5° C.

Calcd. for $C_{16}H_{22}N_2O$ x HCl (percent): C, 65.18; H, 7.86; N, 9.50. Found (percent): C, 65.4; H, 7.89; N, 9.68.

EXAMPLE 4

Quinuclidine-2-carboxylic acid 2-methyl-6-ethylanilide

The anhydride of quinuclidine-2-carboxylic acid hydrochloride was prepared by the method of H. Rinderknecht (Helv. Chim. Acta. 47 (1964), 162). The suspension obtained by mixing 3.85 g. of quinuclidine-2-carboxylic acid hydrochloride and 2.0 g. of triethylamine in 40 ml. of chloroform was treated dropwise with a solution of 1.0 g. of phosgene in 10 ml. of toluene. The mixture was left at room temperature over night and then a solution of 2.7 g. of 2-methyl-6-ethylaniline in 25 ml. of benzene was added. After reflux for 2 hours the mixture was extracted three times with water and the acid aqueous extracts subjected to the same procedure as described in Example 3. There was obtained 1.2 g. of hydrochloride with M.P. 203–8° C. Recrystallization from methyl propylketone raised the melting point to 209–11.5° C.

Calcd. for $C_{17}H_{24}N_2O$ x HCl (percent): C, 66.11; H, 8.16; N, 9.07; Cl, 11.48. Found (percent): C, 65.9; H, 8.14; N, 9.07; Cl, 11.5.

EXAMPLE 5

Quinuclidine -2-carboxylic acid 2,6-diethylanilide

This anilide was prepared in the same way as described in Example 4 from the anhydride and 2,6-diethylaniline. Hydrochloride M.P. 209.5–11.5° C. (from acetonitrile).

Calcd. for $C_{18}H_{26}N_2O$ x HCl (percent): C, 66.96; H, 8.43; N, 8.68; Cl, 10.97. Found (percent): C, 66.7; H, 8.20; N, 8.66; Cl, 11.1.

EXAMPLE 6

Quinuclidine-3-carboxylic acid o-chloroanilide

A mixture of 1.9 g. of quinuclidine-3-carboxylic acid hydrochloride and 20 ml. of thionylchloride was refluxed for 2.5 hours. Excess thionylchloride was then distilled off using two portions of benzene. The residue was dissolved in 25 ml. of chloroform, whereupon 6.5 g. of o-chloroaniline were added. When the slightly exothermic reaction had subsided, the mixture was refluxed for 1 hour. The precipitated anilinehydrochloride was filtered off by suction, and the filtrate extracted with dilute hydrochloric acid. The pH of the extract was adjusted to 5.5 and excess chloroaniline extracted with ether. The solution was then made alkaline (pH 10). The precipitated base amounted to 1.8 g. with a melting point of 157–165° C. Two recrystallizations from methyl-isobutylketone raised the melting point to 166.5–168.5° C.

Calcd. for $C_{14}H_{17}N_2OCl$ (percent): C, 63.51; H, 6.47; N, 10.58; Cl, 13.39. Found (percent) C, 62.5; H, 6.33; N, 10.9; Cl, 13.48.

EXAMPLE 7

Quinuclidine-3-carboxylic acid anilide

Portions of 1.55 g. of quinuclidine-3-carboxylic acid and 2.12 g. of N,N'-diphenylurea were intimately mixed and heated to 210° C. with stirring. The melt obtained was kept at this temperature for 4 hours with continued stirring.

After cooling the brownish black reaction mixture was dissolved in dilute hydrochloric acid. The pH of this solution was adjusted to 5.7 and the solution then washed with ether. It was made strongly alkaline and the precipitated base extracted with ether. The extracts were dried over magnesium sulphate. The filtered ether solution was evaporated somewhat and then cooled, yielding 0.50 g. of product with a melting point of 177–179.5° C. Recrystallization from methyl-isobutylketone raised the melting point to 178–180° C.

Calcd. for $C_{14}H_{18}N_2O$ (M.W.): 230.3. Found (M.W.): 232.7.

EXAMPLE 8

Injectible solution containing quinuclidine-2-carboxylic acid 2-methyl-6-ethylanilide To 100 ml. of hot, sterilized water o.0 g. of methyl p-hydroxybenzoate was added while stirring and heating. When all benzoate had been dissolved 2 g. of quinuclidine-2-carboxylic acid 2-methyl-6-ethylanilide hydrochloride and 0.6 g. of sodium chloride were added while stirring. The pH was adjusted to 7 by adding sodium hydroxide. Sterilized water was added to 100 ml.

EXAMPLE 9

Injectible solution containinp quinuclidine - 2 - carboxylic acid 2-methyl-6-ethylanilide and vasoconstrictor To 100 ml. of hot, sterilized water 0.1 g. of methyl p-hydroxybenzoate, 2 g. of quinuclidine - 2 - carboxylic acid 2-methyl-6-ethylanilide hydrochloride and 0.6 g. of sodium chloride were added in the same way as described in Example 8, but the solution was protected from air-oxygen by working in nitrogen atmosphere. 0.05 g. of sodium pyrosulphite was then dissolved, whereafter 1 mg. of adrenaline was added. pH was adjusted to 4 by adding sodium hydroxide. Sterilized water was added to 100 ml.

We claim:

1. An anilide compound selected from the group consisting of compounds having the formula $$\text{(quinuclidine)}-COHN-\underset{R^2}{\overset{R^1}{\langle\text{phenyl}\rangle}} \quad (I)$$

wherein the carbon atom C is attached to the quinuclidine radical in the 2- or 3-position, and $R_1$ and $R_2$ represent radicals selected from the group consisting of hydrogen, chlorine and an alkyl group of at most three carbon atoms, and the therapeutically acceptable salts thereof.

2. An anilide compound according to claim 1, wherein the C is attached to the quinuclidine radical in the 2-position.

3. An anilide compound according to claim 1 wherein the substituents $R^1$ and $R^2$ are in 2- and 6-positions.

4. Quinculidine-2-carboxylic acid o-toluidide and its therapeutically acceptable salts.

5. Quinuclidine-2-carboxylic acid 2,6-xylidide and its therapeutically acceptable salts.

6. Quinuclidine-2-carboxylic acid 2-methyl-6-ethylanilide and its therapeutically acceptable salts.

7. Quinuclidine - 2 - carboxylic acid 2,6-diethylanilide and its therapeutically acceptable salts.

References Cited

UNITED STATES PATENTS

| | | | |
|---|---|---|---|
| 2,792,399 | 5/1957 | Thuresson et al. | 260—294 |
| 2,799,679 | 7/1957 | Thuresson et al. | 260—294 |

OTHER REFERENCES

Rubtsov et al.: Zhur. Obskichei Khim. 25, 2143–5 (1955), C.A. 50: 8644e supplied.

Mastafanova et al.: Khim. Geterotsiki. Soedin., Akad. Nauk Latv. SSR 1965(6), 858–63, C.A. 64: 12642e supplied.

HENRY R. JILES, Primary Examiner

G. T. TODD, Assistant Examiner

U.S. Cl. X.R.

424—21, 267; 260—294